Sept. 2, 1952 R. D. HENDERSON 2,609,039
AXIALLY COMPRESSING TYPE TIRE DISMOUNTING APPARATUS
Filed Dec. 10, 1946 4 Sheets-Sheet 4
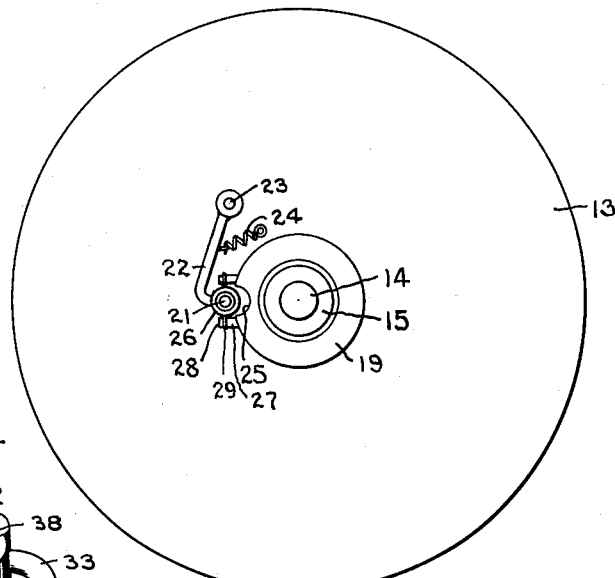
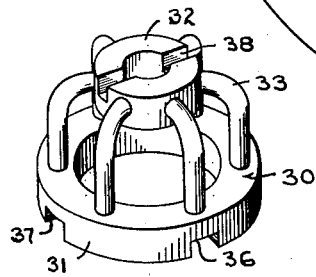
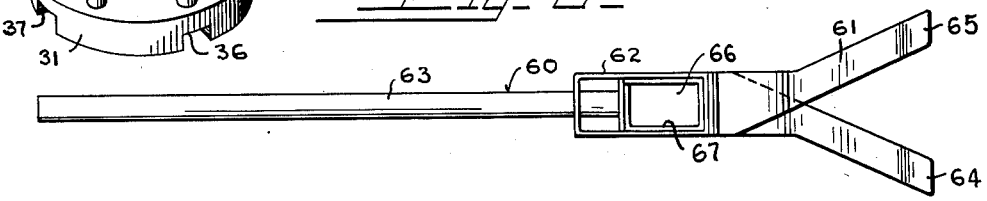
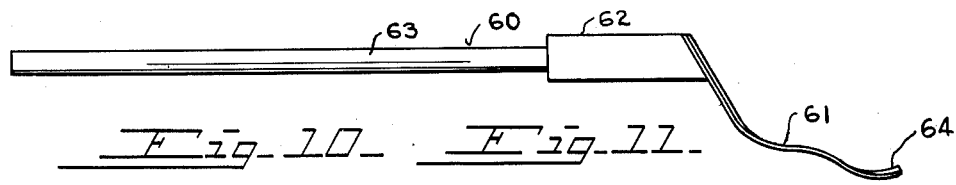
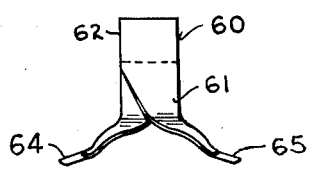
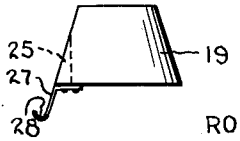
INVENTOR.
ROBERT D. HENDERSON
BY
ATTORNEY.

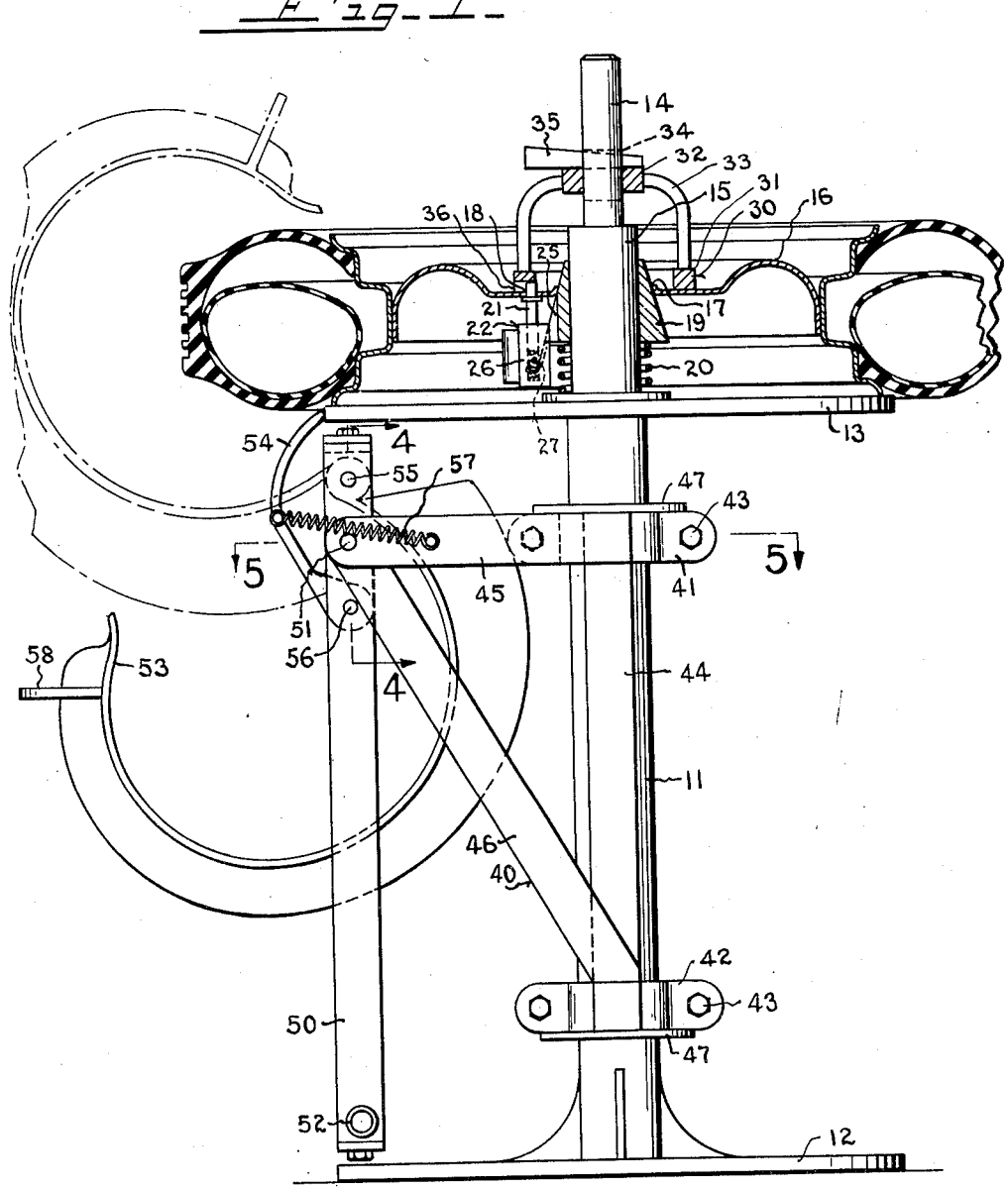

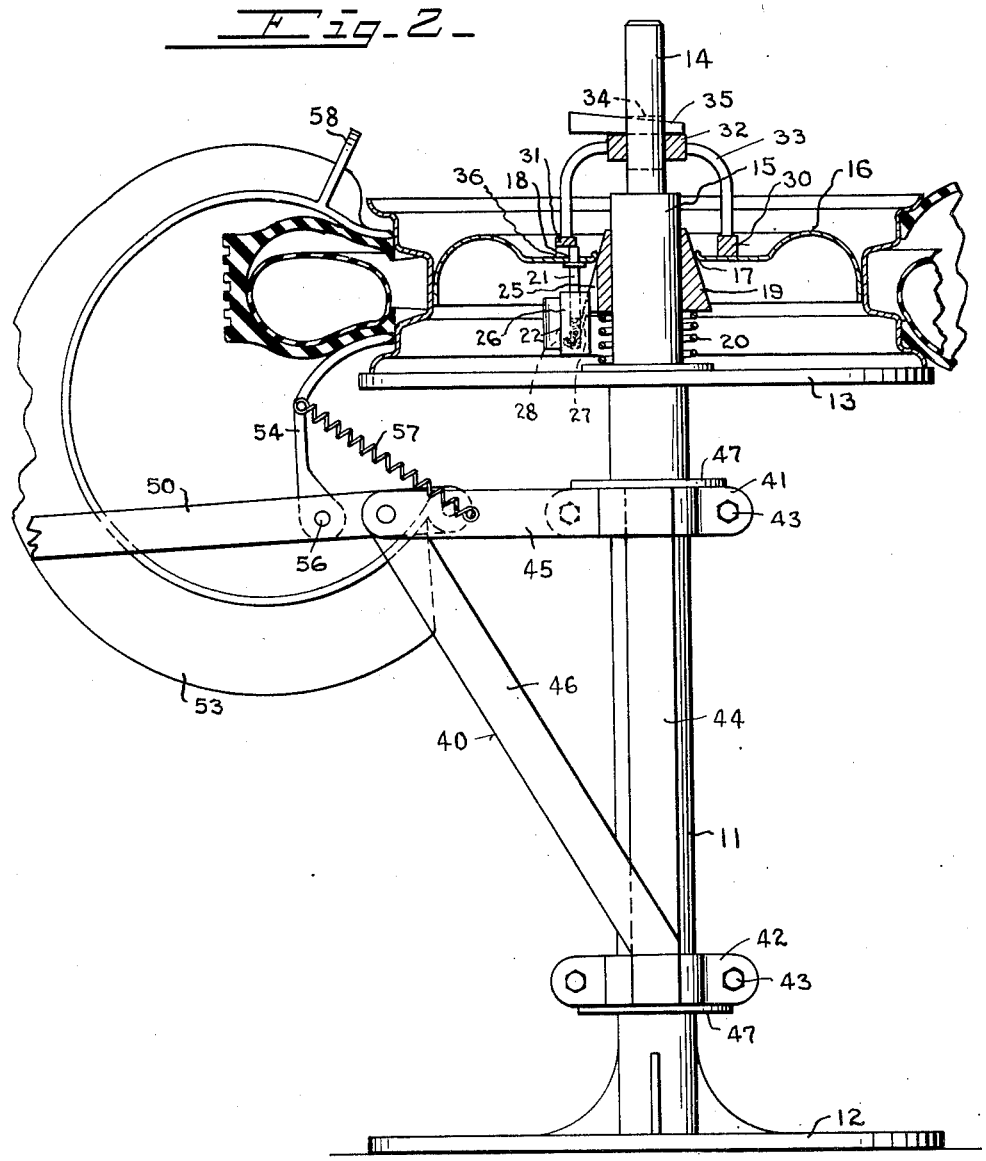

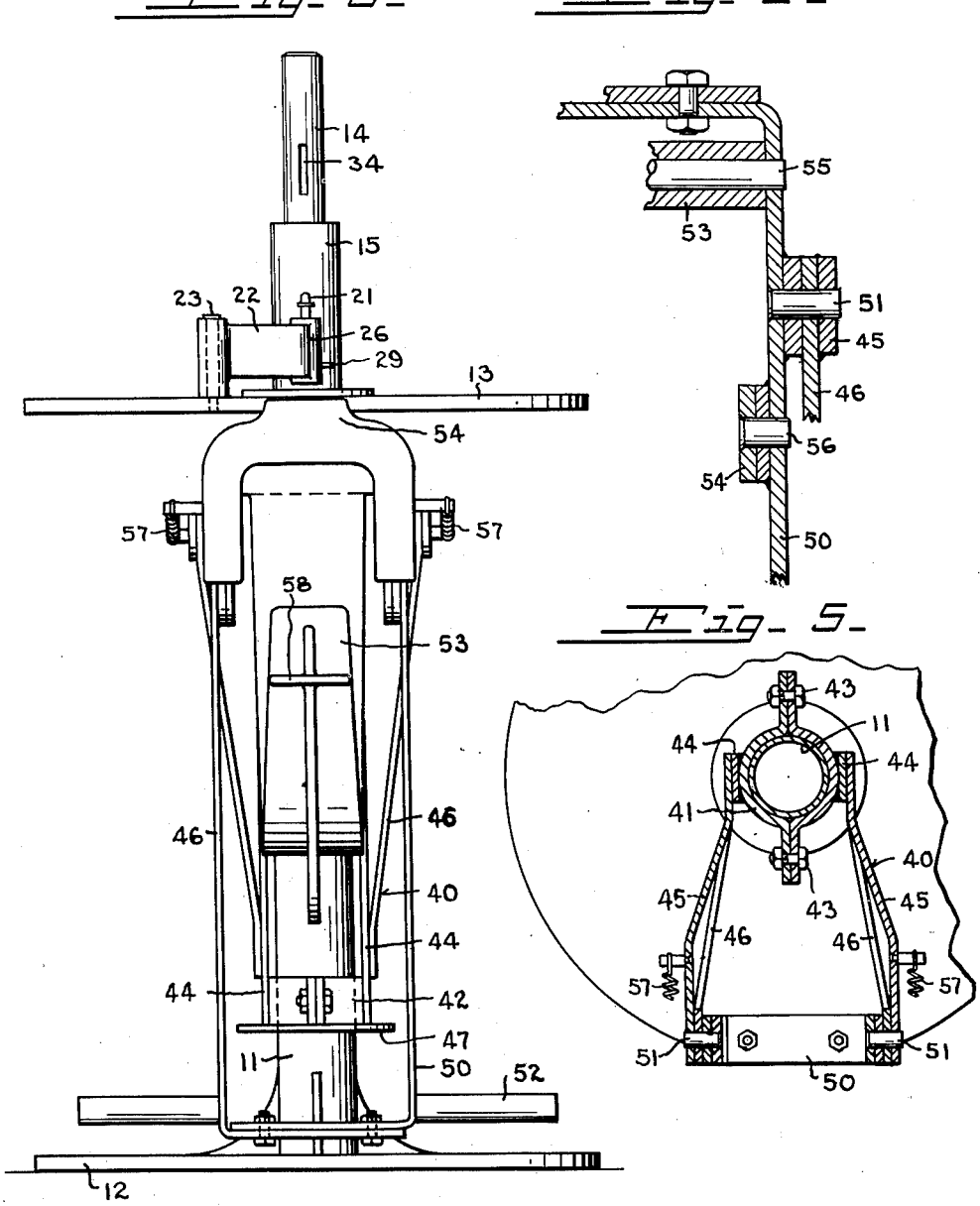

Patented Sept. 2, 1952

2,609,039

UNITED STATES PATENT OFFICE 2,609,039

AXIALLY COMPRESSING TYPE TIRE DISMOUNTING APPARATUS

Robert D. Henderson, Cincinnati, Ohio

Application December 10, 1946, Serial No. 715,284

8 Claims. (Cl. 157—1.24)

This invention relates to a tire dismounting apparatus wherein pressure is simultaneously or individually applied to the respective beads of the tire to move the beads of the tire toward the center well of the wheel after which a tire removing tool is rotated on the structure to remove the tire from the wheel. The device is so constructed that the pressure means can be rotated about the tire for completely freeing both beads of the tire from the wheel.

With my improved structure the wheel is locked on a table high support and pressure is applied to each bead of the tire to force the beads of the tire free of the rim supporting faces. After the beads are freed from the rim faces, a forked tool is engaged under the top bead and brought back over the center post of the table and rotated to lift or unthread the bead from the rim. The inner tube can then be easily removed and the second bead of the tire is removed in a like operation.

The object of my invention is to provide a support for the wheel including means for centering and locking the wheel on the support.

A further object is to provide a pair of co-acting shoes rotatable on said support and arranged to apply pressure to both beads of the tire simultaneously or to either bead selectively as desired.

A further object is to provide pivots for said shoes whereby as pressure is exerted on the shoes, they will follow the inner contour of the wheel for applying the pressure directly to the beads of the tire.

My invention with be further readily understood from the following description and claims and from the drawings, in which latter:

Fig. 1 is a side view of my improved device, partly in section and showing the parts in non-operative position.

Fig. 2 is a similar view with the pressure shoes engaging the tire.

Fig. 3 is an end view of the device as shown in Fig. 1, with the wheel and the cone removed.

Fig. 4 is a detail section, taken in the plane of the line 4—4 of Fig. 1.

Fig. 5 is a further detail section, taken in the plane of the line 5—5 of Fig. 1.

Fig. 6 is a plan view of the device.

Fig. 7 is a perspective view of the locking member.

Fig. 8 is a plan view of the tire removing tool.

Fig. 9 is a side view of the same.

Fig. 10 is an end view of the same; and,

Fig. 11 is a side view of the centering cone.

My improved apparatus comprises a central support or member 11 suitably secured to a base 12 and having a table 13 on the upper end of the support. A shaft 14 extends upwardly from the table and is provided with an enlarged base portion 15.

The table 13 is of sufficient size to support a wheel 16 in such a manner as to extend beyond the outer periphery of the rim of the largest sized wheel to be accommodated by the device. Present day pleasure car wheels range from fifteen to sixteen inches and have a central opening 17 which varies in diameter depending on the make and size of wheel. Also the lug attaching apertures 18 are radially spaced according to the opening 17. Therefore I provide a cone 19 supported on a spring 20 to provide centering means for the wheel on the table. The wheel is held against rotation by means of a spring pressed pin 21 extending from an arm 22 which is pivoted on the table by a pivot 23 and urged toward the cone by means of a spring 24. Extending along one side of the cone is a slot 25 to permit the boss 26 to move adjacent to and into the base diameter of the cone. A pair of guides 27 are secured to the base of the cone adjacent to the slot 25 and extend downwardly therefrom terminating in hooks 28. Pins 29 extending from the boss 26 hold the boss in relation to the cone for automatically locating the pin 21 in the aperture 18 in the wheel as the wheel is placed on the table.

To dismount a tire it is essential that the wheel be firmly locked to the table. I therefore provide a locking ring 30 comprising a base 31 to engage the wheel 16 and a spaced collar 32 received over the shaft 14. Ribs 33 extend from the base to the collar. The shaft 14 is provided with a slot 34 to receive a drift key 35 for locking the ring 30 over the wheel for clamping the wheel to the table. Slots 36 and 37 in the base are for the purpose of clearing the pin 21, while the cross-slot 38 in the collar is provided for locking wide wheels.

Means are provided to break the beads of the tire from the rim and comprises a pivoted support 40 which consists of a pair of split rings 41 and 42 clamped around the support 11 by means of bolts 43 but being sufficiently free to rotate on the support. Side members 44 are welded to the split rings and extending arms 45 and braces 46 are welded together and to the side members 44. Collars 47 on the support locate the pivoted support 40. A frame or lever 50 is pivoted to the pivoted support 40 by means of pivots 51, and is provided at its lower end with a handle 52.

Spaced from the pivotal point 51 is a pair of jaws or shoes 53 and 54 pivoted to the frame as at 55 and 56. Jaw 53 is pivoted to lever 50 as at 55 on that side of pivotal point 51 adjacent table 13, whereas jaw 54 is pivoted at 56 to the lever on that side of pivotal point 51 remote from the table. Jaw 53 is substantially U-shaped whereby to extend around and over a tire mounted on a wheel supported on the table, see Fig. 2. The free outer end of jaw 53 is adapted to be manually introduced into the juncture formed by the tire casing and the upper edge of the outer periphery of the rim of wheel 16. As lever 50 is lifted in clockwise direction about pivotal connection 51, the free end of jaw 53 will be wedged between the adjacent, complementary portions of the casing and rim while at the same time prying the casing downwardly away from the rim for breaking the bead of the casing loose from the rim.

Jaw 54 is constructed and arranged whereby its free edge is normally urged inwardly, that is, toward support member 11, such as by means of a spring 57. When lever 50 is in a lowered, non-operative position (Fig. 1), the free outer end of jaw 54 will contact the outer periphery of table 13. As lever 50 is actuated, in a clockwise direction about pivotal point 51, jaw 54 will be automatically elevated along and in contact with the outer periphery of table 13, thence over the upper surface of the table until contacting the outer periphery of the lower rim of the wheel. The free outer end of jaw 54 will then follow or climb the contour of the inner face of the lower rim of the wheel for progressively prying and loosening the casing and bead of the tire relative to complementary portions of the rim.

It will be observed that if desired, the device may be operated wherein only jaw 54 is actuated whereby only the lower bead of a tire is broken; or the device may be operated whereby the upper and lower beads are simultaneously broken, it being further noted that whereas the operating characteristics of the lower jaw 54 are fully automatic, the locating characteristics of the upper jaw 53 are manual.

It will likewise be noted that after the beads have been broken, at one place along the rim of a wheel, the jaws and actuating lever 50 may be rotated, while in the position of Fig. 2, relative to member 11 for progressively loosening the bead of the casing throughout its entire circumference.

To operate the apparatus thus far disclosed the wheel is clamped on the table, the tire is deflated and the shoe 53 is manually raised over the tire as shown in dotted lines in Fig. 1 and the handle 52 is raised to cause the shoes to engage the beads of the tire to apply pressure to both sides of the tire to free the beads from the rim. It will be noted that the tips of the shoes will follow the contour of the rim as shown in Fig. 2. By working the handle up and down and moving about the periphery of the tire the entire casing can be freed from the rim seat. While the handle is actuated by one hand, the upper shoe can be guided by the other hand into correct position by applying pressure on the extending flange 58.

After the beads are loosened from the rim, the removing tool 60 shown in Figs. 8, 9 and 10 is applied to the upper bead. This tool comprises a forked member 61 secured to a box structure 62 from which a handle 63 extends. The forked member has the ends 64 and 65 angled to enable the operator of the device to observe the innertube of the tire being pried off and to present the ends of the fork parallel to the rim edge when vertically inserted under the bead. To insert the tool under the bead the handle is raised to a vertical position and the ends of the forked member are inserted between the rim and the upper bead and the tool is tilted back with the opening 66 in the box structure received over the shaft 14 and the tool is rotated to lift or unthread the upper bead from the rim, it being understood that the upper or top wall of the box will hangingly engage the free upper end of shaft 14, thereby providing a fulcrum point about which the tool may be moved for lifting or prying a segment of the upper bead of a tire over the outer edge of the rim of a wheel. The opening in the box structure is lined with a suitable material 67 which may be leather to prevent abrasion to the shaft. The inner tube is then removed and a similar operation is applied to the lower bead to entirely remove the tire from the wheel.

Having thus fully described my invention, what I claim as new and desire to secure by Letters Patent, is:

1. A device for prying loose the bead of a pneumatic tire from a complementary portion of a rim of a wheel on which the tire is mounted, said device comprising, a member providing a guiding edge, means for holding a wheel against axial and lateral displacement in such position that the juncture of the bead of a tire and the rim of a wheel held by said holding means resides adjacent the said guiding edge at one side thereof, a shoe located adjacent the guiding edge at the side thereof opposite the said rim and bead juncture, the said shoe having a forward prying portion which is insertable into the juncture of the rim and bead, a lever in pivotal connection with a portion of said shoe remote from its forward prying portion, and means for mounting said lever on a pivotal axis which is fixed in respect to said guiding edge and which is located between the said guiding edge and the axis at which the said shoe is pivotally connected to said lever, the said shoe having an inwardly inclined surface facing the axis of a wheel held by said holding means when said lever is in inoperative position, which inclined surface is progressively engageable with said guiding edge upon actuation of said lever, until the prying portion of the shoe engages the wheel rim.

2. A device for prying loose the bead of a pneumatic tire from a complementary portion of a rim of a wheel on which the tire is mounted, said device comprising, a member providing a guiding edge, means for holding a wheel against axial and lateral displacement in such position that the juncture of the bead of a tire and the rim of said wheel held by said holding means resides adjacent the said guiding edge toward one side thereof, a shoe having a forward prying portion presenting a face inclined inwardly toward the central axis of a wheel held by said holding means, the said shoe being located at the other side of said guiding edge and the said inclined face being engageable therewith, means for biasing said shoe toward said guiding edge, and means for actuating said shoe comprising a lever to which a portion of said shoe remote from the forward prying portion is pivotally connected and means for pivotally mounting the said lever at an axis which is fixed in respect to said guiding edge and which resides generally between the said guiding edge and the axis at which the said shoe is pivotally interconnected with said lever, whereby the actuation of said lever is effective to advance the inclined face of the shoe along the guiding edge for engagement of the forward prying portion with the juncture of the rim of a wheel held by said holding means and the bead of a tire mounted on said rim, the said lever, upon further movement, subsequently advancing the forward portion of said shoe along the cross sectional contour of said rim under the guidance of the rim itself.

3. A device for prying loose the bead of a pneumatic tire from a complementary portion of a rim of a wheel on which the tire is mounted, said device comprising a member providing a guide edge, means for holding a wheel against axial and lateral displacement in such position that the juncture of the rim of said wheel and the bead of the tire resides adjacent said guide edge at one side thereof and radially inwardly therefrom with respect to the center of the wheel, a shoe having a tire prying surface at one side thereof and a leading edge at one end thereof, said leading edge being insertable into the juncture of the wheel rim and tire bead, the said tire prying surface of said shoe facing generally radially outwardly with respect to the center of the wheel, and the said shoe having a face opposite the tire prying face which is inclined inwardly toward the central axis of a wheel held by said holding means and which is progressively engageable with said guide edge, a lever in pivotal connection with a portion of said shoe remote from its leading edge, means for mounting said lever on a pivotal axis which is disposed between said guide edge and the axis at which said shoe is pivotally connected to said lever when said shoe is in normal position, and means biasing said shoe toward said guide edge whereby, upon actuation of the lever to swing said shoe toward the tire, said inclined face tracks upon said guide edge and said leading edge subsequently tracks upon the inner surface of said rim thereby bringing said tire prying surface into bead engaging position.

4. A device for breaking the bead of a pneumatic tire from the rim flange of a wheel, comprising a support for holding a wheel while a tire carried thereby is being worked upon, an actuating lever, means pivotally mounting the actuating lever upon said support at an axis residing adjacent one side of a wheel which is mounted upon said support, a pair of jaws pivotally mounted on said lever at axes which are located respectively at opposite sides of the pivotal axis at which the lever is mounted, the said jaws being dissimilar in size but having curved tire engaging surfaces which face in the same direction when the jaws are in engagement with a tire, the locus of movement of the pivotal axis of the smaller of said jaws, in response to actuation of said lever, being generally more remote from the tire than the locus of movement of the pivotal axis of the larger of said jaws, the smaller of said jaws being dimensioned to act upon the tire bead which is at the side of said tire nearest the axis on which the said lever is mounted, while the larger of said jaws is dimensioned to encircle a tire for acting upon a bead portion at the opposite side of the tire.

5. A device for demounting a tire casing from a wheel rim, comprising a support having means thereon for holding a wheel while a tire carried thereby is being demounted from the wheel rim, a pair of pry jaws having endwise portions which are respectively adapted to enter the recesses between beads of the tire and the flanges of the rim at the opposite sides of the tire, one of said jaws being dimensioned to encircle said tire and both of said jaws having curved tire engaging surfaces which face in the same direction when the surfaces are in tire engagement, an actuating lever pivotally mounted upon said wheel support, and the said jaws being in pivotal interconnection with said actuating lever at points upon the lever which are located at opposite sides of the point at which the said lever is pivoted on said support, for movement of the jaws in unison toward opposite sides of the tire in response to actuation of said lever in a single direction.

6. A device for prying loose the bead of a pneumatic tire from complementary portions of the rim of a wheel, which device comprises, a central member, a wheel supporting table secured to said member, means to lock a wheel to said table, a lever pivotally supported on said member below said table, a curved bead breaking jaw pivotally secured at one of its ends to said lever on that side of its pivotal connection with said member which is remote from said table when the lever is in its inoperative position, said curved bead breaking jaw having its concave side facing said central member and having its free end portion engageable with the edge portion of said table when said lever is in its inoperative position, whereby the free end portion of said jaw will automatically engage and move upwardly over the outer periphery of the table and then contact and progressively follow the contour of the inner face of the rim of the wheel for progressively prying and loosening the bead of a tire mounted on said wheel incident to movement of said lever for elevating said jaw.

7. A device for loosening the bead of a pneumatic tire from complementary portions of the rim of a wheel, which device comprises a centering post, a wheel supporting table on said post, means to center and lock a wheel on said table, means rotatable on said post below said table, a lever pivotally secured to said rotatable means below said table, a curved bead breaking jaw pivotally secured at one of its ends to said lever on that side of the pivotal connection of said lever with said rotatable member which is remote from said table, said curved bead breaking jaw having its concave side facing said central member and having its free end portion engageable with the edge portion of said table when said lever is in its inoperative position, and means urging the free end of said jaw toward said central member, whereby the free end portion of said jaw will automatically engage and move upwardly over the outer periphery of the table and then contact and progressively follow the contour of the inner face of the rim of the wheel for progressively prying and loosening the bead of a tire mounted on said wheel incident to movement of said lever for elevating said jaw.

8. A device for loosening both beads of a pneumatic tire from complementary portions of the rim of a wheel, which device comprises, a central member, a wheel supporting table on said member, means to center and lock a wheel on said table, means rotatable on said member below said table, a lever pivotally secured to said rotatable means below said table, a pair of dissimilar bead breaking jaws pivotally secured to said lever on opposite sides of its pivotal connection with said rotatable member, means normally urging the outer end of that jaw which is pivoted to said lever remote from said table toward said central member, said jaw having an inwardly curved side facing said central member when said lever is in its inoperative position and having a free end portion engageable with the edge portion of said table, whereby the free end portion of said jaw, upon actuation of said lever, will automatically engage and move upwardly over the outer periphery of the table and then contact and progressively follow the contour of the inner face of the rim of the wheel for progressively prying and loosening the bead of a tire mounted on said wheel incident to movement of said lever for elevating said jaw, said other jaw which is pivoted to said lever adjacent said lever being substantially U-shaped and dimensioned to extend around and over a tire mounted on a wheel supported on said table, the said other jaw having a free outer end which is manually insertable into the juncture between a tire casing and its associated rim, the said other jaw being moved into bead loosening relationship incident to movement of said lever for elevating said first mentioned jaw.

ROBERT D. HENDERSON.

REFERENCES CITED

The following references are of record in the file of this patent:

UNITED STATES PATENTS

| Number | Name | Date |
|---|---|---|
| 1,066,210 | Mahon | July 1, 1913 |
| 1,217,777 | Kinsolving | Feb. 27, 1917 |
| 1,260,587 | Sorrell | Mar. 26, 1918 |
| 1,318,032 | Turner | Oct. 7, 1919 |
| 1,432,967 | Clark | Oct. 24, 1922 |
| 1,552,928 | Hershon | Sept. 8, 1925 |
| 1,569,310 | Trevorrow | Jan. 12, 1926 |
| 1,646,511 | Weaver et al. | Oct. 25, 1927 |
| 1,651,389 | Heineke | Dec. 6, 1927 |
| 1,966,766 | Raby et al. | July 17, 1934 |
| 2,034,819 | Maulis | Mar. 24, 1936 |
| 2,057,200 | McCarthy | Oct. 13, 1936 |
| 2,171,282 | Wochner | Aug. 29, 1939 |
| 2,201,982 | Bazarek | May 28, 1940 |
| 2,212,768 | Bonneau | Aug. 27, 1940 |
| 2,233,371 | Smith | Feb. 25, 1941 |
| 2,333,880 | Ohlsen | Nov. 9, 1943 |
| 2,471,642 | Moltz | May 31, 1949 |
| 2,534,950 | Butterfield et al. | Dec. 19, 1950 |

OTHER REFERENCES

Popular Science Magazine, page 94, May 1940.